United States Patent [19]

Yamamoto et al.

[11] Patent Number: 5,204,297
[45] Date of Patent: Apr. 20, 1993

[54] SILICON NITRIDE SINTERED BODY AND PROCESS FOR PRODUCING THE SAME

[75] Inventors: Takehisa Yamamoto; Takao Nishioka; Kenji Matsunuma; Akira Yamakawa; Masaya Miyake, all of Itami, Japan

[73] Assignee: Sumitomo Electric Industries, Ltd.

[21] Appl. No.: 825,989

[22] Filed: Jan. 27, 1992

[30] Foreign Application Priority Data

May 22, 1991 [JP] Japan .................................. 3-117315
Sep. 2, 1991 [JP] Japan .................................. 3-221603

[51] Int. Cl.$^5$ .............................................. C04B 35/58
[52] U.S. Cl. ........................................ 501/97; 501/98
[58] Field of Search .................................. 501/97, 98

[56] References Cited

FOREIGN PATENT DOCUMENTS 0199581 11/1984 Japan ..................................... 501/98

Primary Examiner—Mark L. Bell
Assistant Examiner—Paul Marcantoni
Attorney, Agent, or Firm—Jordan B. Bierman

[57] ABSTRACT

The present invention relates to a silicon nitride sintered body [wherein the composition of $Si_3N_4$-first aid ($Y_2O_3$+MgO)-second aid (at least one of $Al_2O_3$ and AlN)] falls within a range defined by lines joining points A, B, C and D in FIG. 1, the crystal phase of the sintered body contains both $\alpha$-$Si_3N_4$ and $\beta'$-sialon, and the relative density is 98% or more. This sintered body is produced by subjecting a green compact of the above-described source to primary sintering in a nitrogen gas atmosphere at 1300° to 1700° C. so that the relative density reaches 96% or more, and the precipitation ratio of the $\alpha$-$Si_3N_4$ crystal phases to the $\beta'$-sialon crystal phase in the sintered body is in the range of from 40:60 to 80:20; and then subjecting the primary sintered body to secondary sintering in a nitrogen gas atmosphere at 1300° to 1700° C. so that the relative density reaches 98% or more. The sintered body has superior strength properties, especially at ordinary temperatures, and can be produced with a high productivity in a high yield at a low cost.

5 Claims, 2 Drawing Sheets

SILICON NITRIDE SINTERED BODY AND PROCESS FOR PRODUCING THE SAME

BACKGROUND OF THE INVENTION

1. Field of the Invention

The present invention relates to a silicon nitride sintered body excellent in mechanical strengths particularly at room temperature, and also in productivity and cost, and a process for producing the same.

2. Description of the Prior Art

Regarding the silicon nitride material, various research and development have hitherto been made mainly on sintering method, sintering aid and limitation of a contained crystal phase, etc., for the purpose of improving the strength. For example, as regards the sintering method, the hot press sintering has realized a bending strength of about 100 kg/mm$^2$ [see Am. Ceram. Soc. Bull., vol. 52, p.560 (1973)] and use has been made of hot isotatic pressing (HIP) in a glass capsule. These methods provide a sintered body having excellent strength properties but are not always excellent in the productivity and cost. In order to solve such a problem, a proposal has been made on gas pressure sintering [see, for example, Mitomo, Funtai to Kogyo (Solids Handling Processing Industry), vol. 12, No. 12, p.27 (1989)]. In this method, however, the densification of the final sintered body companies the growth of δ-Si$_3$N$_4$ crystal grains and, thus, is highly liable to bring about the deterioration of the strength due to the precipitation of coarse crystal grains. Further, since the sintering is generally conducted under a nitrogen gas pressure of 10 atm or more, large-size sintering equipment becomes necessary as in the case of the hot pressing and HIP. For this reason, this method has not been regarded as a technique capable of sufficiently satisfying both the requirements of properties and productivity. Regarding the sintering aid, Japanese Patent Publication Nos. 21091/1974 and 38448/1973 disclosed silicon nitride sintered bodies comprising Si$_3$N$_4$-Al$_2$O$_3$-Y$_2$O$_3$ wherein Y$_2$O$_3$ was used as a main aid. As described therein, it is conceivable that a β-type silicon nitride (β-Si$_3$N$_4$) crystal grain forms a fibrous structure in the sintered body and dispersed in the matrix, thus improving the strength utilized the fact that the β-Si$_3$N$_4$ crystal has a hexagonal crystal structure and therefore grows anisotropically in the direction of the C-axis. In particular, as described in the Japanese Patent Publication No. 38448/1973 and Journal of the Ceramic Society of Japan, vol. 94, p.96 (1986), a fibrous β-Si$_3$N$_4$ crystal often grows in a length of ten-odd μm or more in the direction of the C-axis. In this technique as well, however, there is a possibility that the grain growth may bring about an abnormal growth and the formation of pores, thus lowering the strength. Further, in a sintered body produced through the use of a sintering aid alone in this method, no sufficient densification can be attained without raising the sintering temperature to 1700° to 1900° C., and in the nitrogen gas pressure sintering near atmospheric pressure, silicon nitride decomposes through sublimation, so that no stable sintered body can be obtained in some cases. Therefore, similarly, this method cannot be regraded as excellent in both the properties of the sintered body and the cost. In any of the above-described methods, the strength of the resultant sintered body is about 100 kg/mm$^2$ at the highest in terms of the three-point bending strength according to JIS R 1601, and no satisfactory properties can be always obtained when the use of silicon nitride materials in various applications is taken into consideration.

SUMMARY OF THE INVENTION

An object of the present invention is to provide a method which can simultaneously satisfy both requirements of the productivity and mechanical properties of the sintered body in the prior art.

In accordance with the present invention, there is provided a silicon nitride sintered body consisting of a composition falling within a range enclosed by the lines joining the points A, B, C and D shown in the ternary composition diagram of Si$_3$N$_4$-first air-second aid in FIG. 1, the first aid consisting of a combination of Y$_2$O$_3$ and MgO, the second aid consisting of one or both of Al$_2$O$_3$ and AlN wherein the addition composition ratio of Si$_3$N$_4$ to the first aid is in the range of from 85:15 to 99:1 by percent by mole and the addition composition ratio of Si$_3$N$_4$ to the second aid is in the range of from 90:10 to 99:1 by percent by mole, said sintered body comprising crystal phases containing both an α-Si$_3$N$_4$ crystal phase and a β'-sialon crystal phase, the relative density of the sintered body being 98% or more.

In the present invention, it has been found that this sintered body easily has excellent properties, i.e., a high strength of at least 100 kg/mm$^2$ in terms of the three-point bending strength as measured according to JIS R 1601.

In another embodiment of the present invention, there is provided a process for producing a silicon nitride sintered body, the process comprising the steps of:

forming a green compact from a mixed powder consisting of a composition falling within a range surrounded by the lines joining the points A, B, C and D in the ternary composition diagram of Si$_3$N$_4$-first aid-second aid shown in FIG. 1, the Si$_3$N$_4$ source powder having a percentage α crystallization of 93% or more and a mean grain diameter of 0.8 μm or less, the first aid consisting of a combination of two oxides of Y$_2$O$_3$ and MgO, the second aid consisting of one or both of Al$_2$O$_3$ and AlN wherein the addition composition ratio of Si$_3$N$_4$ to the first aid is in the range of from 85:15 to 99:1 by percent by mole and the addition composition ratio of Si$_3$N$_4$ to the second aid is in the range of from 90:10 to 99:1 by percent by mole;

subjecting the green compact to primary sintering at 1300° to 1700° C. in a nitrogen gas atmosphere so that the relative density of the resultant sintered body reaches 96% or more, the precipitation ratio of the α-Si$_3$N$_4$ crystal phase to the β'-sialon crystal phase in the sintered body is in the range of from 40:60 to 80:20 in terms of the peak intensity in X-ray diffraction; and then subjecting the sintered body to secondary sintering at 1300° to 1700° C. in a nitrogen gas atmosphere so that the relative density of the sintered body reaches 98% or more.

This process is excellent in the productivity of the sintered body. Further, since the sintering temperature is low, there occurs no deterioration of the properties of the sintered body derived from abnormal grain growth. The superior strengthening effect of the sintered body of the present invention is due to the formation of a composite crystal phase comprising a fine particle isometric α-Si$_3$N$_4$ crystal phase and a columnar β'-sialon crystal phase, and the Young's modulus and hardness are greatly improved as compared with those of a conventional sintered body consisting of a 'β-sialon (including β-Si₃N₄) crystal phase alone. The Young's modulus and hardness serve as a measure of the deformation resistance of the material, and it is thought that in brittle material, such as a ceramic material, an improvement in these values contribute to an improvement in the strength of the material in a broad sense. Further, according to the Griffith theory which is a fundamental conception of the fracture of the brittle material, the fracture strength, of, of a sintered body is given by the following equation:

$$\sigma f = E\gamma s/4a$$

wherein E is a Young's modulus, γs is a surface energy of fracture and a is a latent crack length. Since the γs is thought to depend upon the composition and thickness of the grain boundary phase, the formation of a composite crystal phase which contributes to an improvement in the abundance of the crystal grain is advantageous from the viewpoint of thickness. Further, according to this equation, an increase in the E value and a reduction in the a value are important to an improvement in the fracture strength. Since the a value depends upon the crystal grain diameter when the dimensional distortion unavoidably occurring in the process is eliminated, the present invention which can improve the filling property by virtue of a fine crystal grain is effective in improving the strength in respect of E and γs values. An idea on the formation of a composite crystal phase from the α-Si₃N₄ (including α'-sialon) and the columnar β-Si₃N₄ (including β'-sialon) is disclosed in, for example, Japanese Patent Laid-Open Nos. 91065/1986 and 44066/1990. In these cases, however, the composite crystal phase is mainly composed of a ternary system comprising Si₃N₄-AlN-MO wherein MO is MgO, Y₂O₃, CaO or the like, and exhibits an improvement in the mechanical properties, such as strength, by the formation of a composite crystal phase comprising α'-sialon and β-type Si₃N₄ (including β'-sialon) in a limited AlN to MO addition composition ratio of 1:9 by percent by mole. As is apparent also from the working examples, all the sintered bodies having such strength properties that the bending strength stably exceeds 100 kg/mm² are obtained by hot pressing, and this method cannot stably provide a high strength on an industrial scale. Another object of the present invention is to stably provide a sintered body having a high strength on an industrial scale without limitation of the above-described conditions.

DETAILED DESCRIPTION OF THE PREFERRED EMBODIMENTS

The function of the present invention will be now more specifically described hereinafter.

Figure 1:
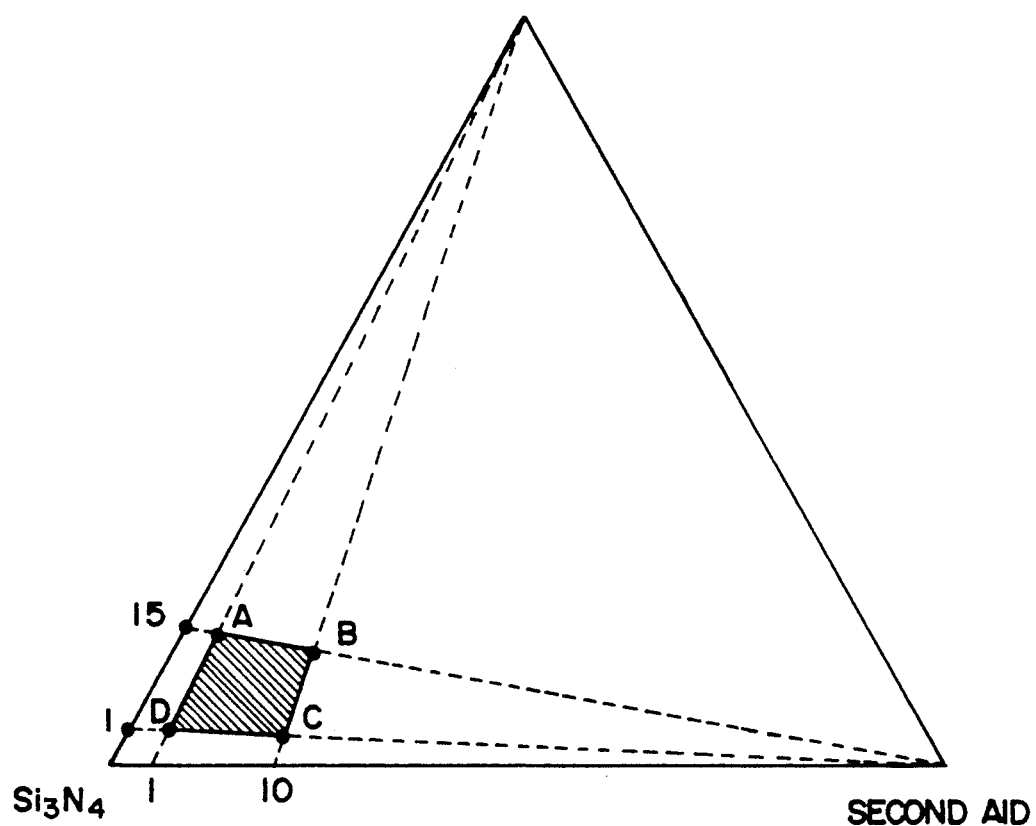
FIG. 1 is a ternary composition diagram showing the composition range of the present invention.

In the present invention, the composition falls within a range surrounded by the lines joining points A, B, C and D shown in FIG. 1 wherein the addition composition ratio of Si₃N₄ to the first aid is in the range of from 85:15 to 99:1 by percent by mole and the addition composition ratio of Si₃N₄ to the second aid is in the range of from 90:10 to 99:1 by percent by mole. Figures shown in FIG. 1 represent molar percentages.

The limitations of the composition of the present invention are as follows:

1) The addition composition ratio of Si₃N₄ to the first aid should be limited so that the precipitation ratio of the α-Si₃N₄ crystal phase to the β'-sialon crystal phase falls in the claimed range.

2) The addition composition ratio of Si₃N₄ to the second aid should be limited so that the solid-dissolution amount of Al and O (oxygen) in the β'-sialon represented by the general formula $Si_{6-z}Al_zO_zN_{8-z}$, more specifically the value of "z" of the formula, falls within the claimed range. These limitations are more specifically explained below. When the addition composition ratio of Si₃N₄ to the first aid deviates from 85:15 by percent by mole towards the first aid side, the content of the α-Si₃N₄ becomes so high that the deterioration of the strength of the sintered body is liable to occur and, at the same time, the sintered body is affected by the atmosphere during sintering, thus causing a layer which deteriorates the properties, such as strength, to be formed on the surface of the sintered body. On the other hand, when the same composition ratio deviates from 99:1 towards the Si₃N₄ side, the sinterability deteriorates, so that no sufficiently densified sintered body can be obtained without the use of pressure sintering, such as hot pressing. When the addition composition ratio of the Si₃N₄ to the second aid deviates from 90:10 by percent by mole towards the second aid side, a coarse crystal of the β'-sialon is selectively formed, so that the strength lowers and the sintered body is affected by the atmosphere during sintering, thus causing a layer which deteriorates the properties, such as strength, to be formed on the surface of the sintered body. On the other hand, when the composition ratio deviates from 99:1 towards the Si₃N₄ side, the sinterability deteriorates, so that no sufficiently dense sintered body can be obtained without the use of pressure sintering, such as hot pressing. Further, in order to make the effect of the present invention more significant, it is preferred to precipitate the crystal phases in such a manner that the precipitation ratio of the α-Si₃N₄ crystal phase to the β'-sialon range of from 40:60 to 80:20 in terms of the peak intensity ratio in X-ray diffraction and the precipitation ratio of the α-Si₃N₄ crystal phase to the β'-sialon crystal phase in the secondary sintered body is more than 0 but not more than 30 in terms of the peak intensity ratio in X-ray diffraction. When precipitation ratio in the primary sintered body deviates from 40:60 towards the high β'-sialon side, the growth of coarse β'-sialon crystals occurs in the secondary sintered body. On the other hand, when the precipitation ratio in the primary sintered body exceeds 80:20 and deviate towards the high α-Si₃N₄ content, a densified secondary sintered body can not be obtained. When no α-Si₃N₄ crystal phase is contained in the secondary sintered body, no sufficient effect of improving the strength can be attained because the effect derived from the formation of a composite crystal phase cannot be sufficiently exhibited. On the other hand, when the precipitation ratio of α-Si₃N₄ crystal phase to the β'-sialon crystal phase is more than 30 in terms of the peak intensity ratio in X-ray diffraction and deviates towards the high α-Si₃N₄ side, the effect derived from the formation of a composite crystal phase cannot be sufficiently exhibited since the effect derived from the columnar crystal structure of the β'-sialon is reduced, so that no sufficient effect of improving the strength can be attained. When, in the above compositional range of the second sintered body, the z value of the general formula $Si_{6-z}Al_zO_zN_{8-z}$ of the $\beta'$-sialon is limited to the range of $0<z<1.0$ and the crystal grain boundary phase is controlled as specified above, a high strength can be stably obtained. Further, in X-ray diffraction measurements of the above-prescribed composite structure, the $\alpha$-$Si_3N_4$ has a lattice constant of 5.623 in its C-axis.

In the present invention, the production conditions for the claimed sintered body are important. For the production of the sintered body, use is made of a silicon nitride source powder having a percentage $\alpha$ crystallization of 93% or more and a mean grain diameter of 0.8 $\mu$m or less, and a green compact comprising a mixed powder composed of this silicon nitride source powder and aids and having a composition falling within the range defined in FIG. 1 is subjected to primary sintering at 1300° to 1700° C. in a nitrogen gas atmosphere so that the relative density of the resultant sintered body reaches 96% or more and the precipitation ratio of the $\alpha$-$Si_3N_4$ crystal phase to the $\beta'$-sialon crystal phase is in the range of 40:60 to 80:20 in terms of the peak intensity in X-ray diffraction. Then, the resultant primary sintered body is subjected to secondary sintering at 1300° to 1700° C. in a nitrogen gas atmosphere so that the relative density of the sintered body reaches 98% or more, preferably 99% or more. In this case, the silicon nitride source powder should have a percentage $\alpha$ crystallization of 93% or more and a mean grain diameter of 0.8 $\mu$m or less for the purpose of improving the sintering property in a low-temperature region. Further, the selection of the composition according to the present invention has enabled the primary sintering to be conducted in a low-temperature region of 1300° to 1700° C. in a nitrogen gas atmosphere. Therefore, the resultant composite grain phase comprises finer crystal grains, so that the effect of the present invention becomes significant. Further, the primary sintering can be conducted through the use of an open type continuous sintering furnace, such as a pusher or belt sintering furnace, with a high productivity. More specifically, in general, gas pressure sintering wherein use is made of the so-called batch type sintering furnace is mainly used for sintering a silicon nitride material having superior strength properties. In this method, however, the scattering of the temperature distribution within the furnace, lot-to-lot scattering of conditions, etc., inevitably occur, which renders this method unsatisfactory as a method of stably feeding a ceramic material used for the mass production of parts, etc. On the other hand, since silicon nitride decomposes through sublimation at 1700 or higher in a nitrogen atmosphere under atmospheric pressure, it is necessary to conduct the sintering in a nitrogen atmosphere under application of pressure. For this reason, a batch type sintering furnace has been used from the viewpoint of usable equipment. In this respect, in the present invention, since the productivity as well can be improved, the present invention is important from the industrial viewpoint.

In this case, the sintering should be conducted at 1300° to 1700° C. for the following reasons in addition to the above-described reason. When the sintering temperature is below 1300° C., no sufficient densification of the sintered body can be attained. On the other hand, when the temperature exceeds 1700° C., the precipitation ratio of the $\alpha$-$Si_3N_4$ phase to $\beta'$-sialon phase does not fall within the range of more than 0 but not more than 30 in terms of the peak intensity in X-ray diffraction. Further, the coarsening of the crystal grain becomes significant, which causes the deterioration or scattering of the strength properties. In the primary sintering, the sintering is conducted until the relative density of the sintered body reaches 96% or more, for the purpose of sufficiently densifying the sintered body in the secondary sintering. The reason why the sintering temperature in the secondary sintering is limited to 1300° to 1700° C. is as follows. As in the case of the primary sintering, when the sintering temperature is below 1300° C., no sufficient densification of the sintered body can be attained, while when the temperature exceeds 1700° C., the precipitation ratio of the $\alpha$-$Si_3N_4$ phase to the $\beta'$- sialon phase does not fall within the range of more than 0 but not more than 30 in terms of the peak intensity in X-ray diffraction. Further, the coarsening of the crystal grain becomes significant, which causes the deterioration or scattering of the strength properties. In particular, the secondary sintering temperature preferably does not exceed the primary sintering temperature for the above-described reason. When the relative density of the resultant sintered body is less than 98%, the scattering of the strength properties unfavorably occurs. When the above-specified composition and sintering conditions are combined with the silicon nitride source having a percentage $\alpha$ crystallization of at least 93% and a mean grain size of at least 0.8 $\mu$m, the desired composite crystal phase consisting of the $\alpha$-$Si_3N_4$ crystal grains having a mean grain diameter of 0.5 $\mu$m or less and $\beta'$-sialon crystal grains having a mean grain diameter, in their major axis, of 5 $\mu$m or less can be easily obtained. Consequently, the three-point bending strength as measured according to JIS R 1601 easily exceeds 100 kg/mm$^2$, and the scattering of the strength properties is very small. Particularly, when the mean grain diameters in the direction of the major axis and in the direction of the minor axis of the $\beta'$-sialon crystal grains are 2.5 $\mu$m or less and 0.5 $\mu$m or less, respectively, a further increased bending strength of 130 kg/mm$^2$ or more can be achieved.

EXAMPLE 1

A silicon nitride source powder having a mean grain diameter of 0.4 $\mu$m, a percentage o crystallization of 96% and an oxygen content of 1.4% by weight and powders of $Y_2O_3$, $Al_2O_3$, AlN and MgO having mean grain diameters of 0.8 $\mu$m, 0.4 $\mu$m, 0.8 $\mu$m and 0.5 $\mu$m, respectively, were wet-mixed with each other by means of a nylon ball mill according to the formulation specified in Table 1 in ethanol for 100 hr. The mixture was dried and subjected to CIP (Cold Isostatic Press) molding under a pressure of 3000 kg/cm$^2$. The obtained green compact was subjected to primary sintering in a nitrogen gas atmosphere under a pressure of 1 atm at 1500° C. for 6 hr and then at 1650° C. for 3 hr. The resultant sintered body was subjected to secondary sintering at 1600° C. in a nitrogen gas atmosphere under a pressure of 1000 atm for 1 hr. Deflection test pieces each having a size of 3 mm $\times$ 4 mm $\times$ 40 mm conforming to JIS R 1601 were cut out of each sintered body and finished through machining with #800 grinding diamond. The tensile surface was finished through lapping with #3000 diamond paste, and the three-point bending strength was measured according to JIS R 1601 using 15 test pieces on each sintered body. The relative density of the primary sintered body, the relative density of the secondary sintered body, the crystal phase ratio, the mean diameter of $\alpha$-$Si_3N_4$ and the mean diameter in the major axis of the $\beta'$-sialon crystal grains, the bending strength and the Weibull coefficient are given in Table 2. The crystal phase ratio was calculated from the peak height ratios of individual crystal phases determined by X-ray diffraction using CuKo radiation.

TABLE 1

| | Addition Composition and Composition ratio (% by mole and molar ratio) | | | | | | |
|---|---|---|---|---|---|---|---|
| | first aid | | | second aid | | | |
| No. | $Y_2O_3$ | MgO | $Si_3N_4$: first aid | $Al_2O_3$ | AlN | $Si_3N_4$: second aid | $Si_3N_4$ |
| 1 | 3.0 | 3.3 | 93:7 | 4.0 | — | 96:4 | balance |
| 2 | 3.2 | 3.4 | 93:7 | 2.6 | 3.2 | 94:6 | balance |
| 3 | 2.9 | 3.0 | 94:6 | 1.3 | 5.8 | 92:8 | balance |
| 4 | 2.8 | 3.3 | 93:7 | — | 9.0 | 90:10 | balance |
| 5 | 1.8 | 3.5 | 95:5 | — | 3.3 | 97:3 | balance |
| 6 | 3.0 | 3.4 | 93:7 | 2.6 | 3.4 | 94:6 | balance |
| 7 | 2.8 | 3.4 | 93:7 | 2.6 | 3.2 | 94:6 | balance |
| 8 | 1.8 | 3.5 | 95:5 | 1.4 | — | 98:2 | balance |
| 9 | 3.0 | 3.5 | 93:7 | 2.6 | — | 97:3 | balance |
| 10 | 1.2 | 3.3 | 95:5 | 2.5 | 3.2 | 94:6 | balance |
| *11 | 1.2 | 1.6 | 97:3 | 2.6 | 3.3 | 94:6 | balance |
| *12 | 1.3 | 1.7 | 97:3 | 0.8 | — | 99:1 | balance |
| 13 | 6.1 | 3.5 | 90:10 | 2.6 | 3.3 | 93:7 | balance |
| *14 | 5.8 | 9.7 | 84:16 | 2.5 | 3.2 | 93:7 | balance |
| *15 | 5.9 | 10.0 | 84:16 | 0.7 | — | 99:1 | balance |
| *16 | 5.5 | 9.3 | 83:17 | 3.6 | 9.1 | 85:15 | balance |
| *17 | 1.2 | 1.6 | 97:3 | 3.8 | 9.5 | 86:14 | balance |

*Comparative Samples

EXAMPLE 2

A commercially available silicon nitride source powder (mean grain diameter: 0.7 $\mu$m, percentage $\alpha$ crystallization: 93%, oxygen content: 1.5% by weight) was mixed with the same aid powder as that of Example 1 according to the formulations 1 to 5 of Examples 1, dried and molded in the same manner as that of Example 1. The obtained green compact was subjected to primary sintering in a nitrogen gas under a pressure of 1 atm at 1550° C. for 5 hr and at 1650° C. for 2 hr and then subjected to secondary sintering in a nitrogen gas atmosphere under a pressure of 1000 atm at 1600° C. for 1 hr. Deflection test pieces conforming to JIS R 1601 were prepared from each sintered body in the same manner as that of Example 1 and applied to the same evaluation test as that of Example 1. The results are given in Table 3.

TABLE 3

| No. | Relative density of primary sintered body (%) | Relative density of secondary sintered body (%) | Crystal phase ratio $\alpha:\beta'$ (%) | Three-point bending strength (kg/mm$^2$) | Weibull coefficient | Mean grain diameter ($\mu$m) | |
|---|---|---|---|---|---|---|---|
| | | | | | | $\alpha$-$Si_3N_4$ | $\beta'$-sialon major axis |
| 1 | 97.2 | 99.9 | 7:93 | 120.2 | 18.6 | 0.50 | 5.0 |
| 2 | 97.5 | 100 | 2:98 | 142.2 | 19.8 | 0.40 | 4.5 |
| 3 | 97.9 | 99.9 | 6:94 | 138.1 | 20.4 | 0.50 | 4.8 |
| 4 | 97.4 | 100 | 7:93 | 132.4 | 18.4 | 0.44 | 4.3 |
| 5 | 96.9 | 100 | 10:90 | 136.5 | 19.0 | 0.47 | 4.8 |

EXAMPLE 3

The same material powders as those used in Example 1 were mixed according to the formulations 1 to 5 of Example 1, dried and molded in the same manner as that of Example 1. The green compact was subjected to primary sintering in a nitrogen gas under a pressure of 1 atm at 1500° C. for 6 hr and at 1650° C. for 3 hr and then continuously subjected to secondary sintering in a nitrogen gas atmosphere under a pressure of 80 atm at 1600° C. for 2 hr. Deflection test pieces conforming to JIS R 1601 were cut out of each sintered body in the same manner as that of Example 1 and evaluated in the same manner as that of Example 1. The results are given in Table 4.

TABLE 2

| No. | Relative density of primary sintered body (%) | Relative density of secondary sintered body (%) | Crystal phase ratio $\alpha:\beta'$ (%) | Three-point bending strength (kg/mm$^2$) | Weibull coefficient | z value ($\beta'$-sialon) | Mean grain diameter ($\mu$m) | |
|---|---|---|---|---|---|---|---|---|
| | | | | | | | $\alpha$-$Si_3N_4$ | $\beta'$-sialon major axis |
| 1 | 97.5 | 100 | 10:90 | 150.2 | 20.0 | 0.2 | 0.50 | 2.4 |
| 2 | 97.8 | 100 | 8:92 | 168.5 | 20.6 | 0.3 | 0.38 | 2.3 |
| 3 | 97.9 | 100 | 9:91 | 165.2 | 20.5 | 0.55 | 0.40 | 2.5 |
| 4 | 97.4 | 100 | 10:90 | 159.4 | 21.2 | 0.6 | 0.35 | 2.5 |
| 5 | 97.1 | 99.5 | 10:90 | 163.2 | 19.8 | 0.2 | 0.25 | 2.3 |
| 6 | 96.9 | 100 | 15:84 | 153.7 | 20.5 | 0.15 | 0.43 | 2.5 |
| 7 | 97.4 | 99.5 | 12:88 | 140.7 | 18.5 | 0.3 | 0.50 | 3.0 |
| 8 | 97.2 | 99.3 | 8:92 | 128.8 | 17.8 | 0.1 | 0.50 | 4.5 |
| 9 | 96.8 | 99.3 | 15:85 | 136.5 | 18.2 | 0.2 | 0.46 | 4.0 |
| 10 | 96.2 | 99.2 | 6:94 | 125.4 | 18.4 | 0.4 | 0.42 | 5.0 |
| *11 | 95.0 | 97.8 | 0:100 | 96.5 | 9.8 | 1.6 | — | 7.0 |
| *12 | 94.3 | 97.2 | 0:100 | 83.4 | 10.2 | 1.2 | — | 6.5 |
| 13 | 97.2 | 99.5 | 22:78 | 118.6 | 16.4 | 0.4 | 0.49 | 4.8 |
| *14 | 96.1 | 99.0 | 25:75 | 98.3 | 12.2 | 1.0 | 0.65 | 5.5 |
| *15 | 96.0 | 98.8 | 23:77 | 87.2 | 9.6 | 0.2 | 1.2 | 6.2 |
| *16 | 96.1 | 99.0 | 40:60 | 94.6 | 11.4 | 1.3 | 0.8 | 5.7 |
| *17 | 95.5 | 98.0 | 16:84 | 83.2 | 8.7 | 1.7 | 1.0 | 6.3 |

*Comparative Samples

TABLE 4

| No. | Relative density of secondary sintered body (%) | Crystal phase ratio α:β' (%) | Three-point bending strength (kg/mm²) | Weibull coefficient | z value (β'-sialon) | Mean grain diameter (μm) α-Si₃N₄ | Mean grain diameter (μm) β'-sialon major axis |
| --- | --- | --- | --- | --- | --- | --- | --- |
| 1 | 100 | 12:88 | 140.2 | 22.5 | 0.25 | 0.4 | 2.5 |
| 2 | 100 | 9:91 | 161.4 | 21.9 | 0.25 | 0.3 | 2.3 |
| 3 | 100 | 10:90 | 150.8 | 22.0 | 0.5 | 0.3 | 2.5 |
| 4 | 100 | 12:88 | 148.5 | 21.3 | 0.6 | 0.5 | 2.4 |
| 5 | 100 | 18:82 | 133.6 | 21.8 | 0.3 | 0.5 | 3.2 |

EXAMPLE 4

A silicon nitride source powder having a mean grain diameter of 0.4 μm, a percentage o crystallization of 96% and an oxygen content of 1.4% by weight and powders of $Y_2O_3$, $Al_2O_3$, AlN and MgO respectively having mean grain diameters of 0.8 μm, 0.4 μm, 0.5 μm and 0.5 μm were wet-mixed with each other by means of a nylon ball mill according to the formulation specified in Table 5 in ethanol for 100 hr. The mixture was dried and subjected to CIP molding under a pressure of 3000 kg/cm². The obtained green compact was subjected to primary sintering in a nitrogen gas atmosphere under a pressure of 1 atm at about 1650° C. for 5 hr to 10 hours. The resultant sintered body was subjected to secondary sintering at 1650° C. in a nitrogen gas atmosphere under a pressure of 100 atm for 1 hr. Deflection test pieces each having a size of 3 mm×4 mm×40 mm conforming to JIS R 1601 were cut out of each sintered body and finished through machining with #800 grinding diamond. The tensile surface was finished through lapping with #3000 diamond paste, and the three-point bending strength was measured according to JIS R 1601 using 15 test pieces on each sintered body. The relative density of the primary sintered body, the relative density of the secondary sintered body, the crystal phase ratio, the mean grain sizes of α-$Si_3N_4$ and β'-sialon crystal grains, the bending strength and the Weibull coefficient are given in Table 6.

Figure 2:
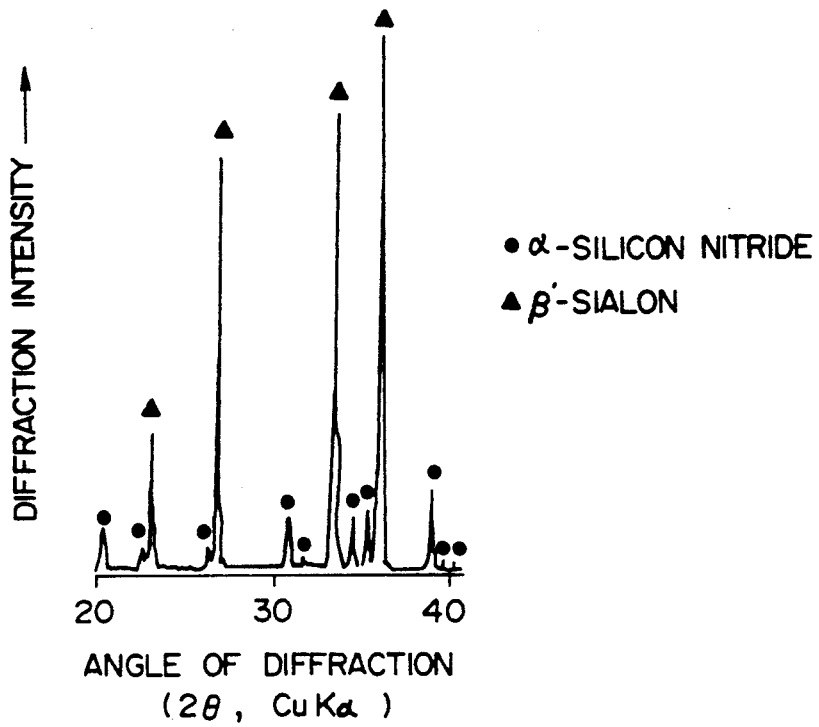
FIGS. 2 and 3 are X-ray diffraction diagrams for Sample No. 7 and Comparative Sample No. 16 prepared in Example 4.
Figure 3:
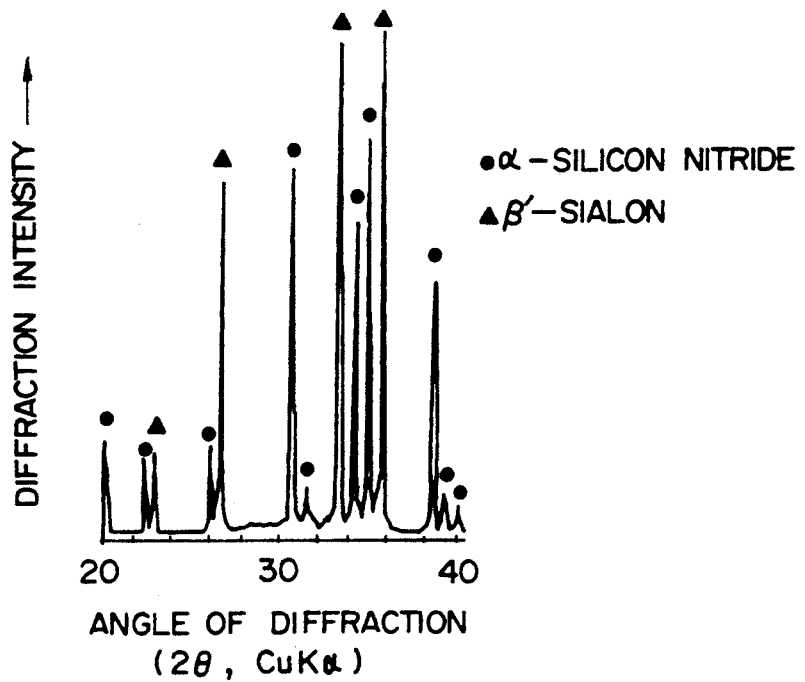

The crystal phase ratio was calculated from the peak height ratios of individual crystal phases determined by X-ray diffraction using $CuK_\alpha$ radiation, as shown in FIGS. 2 and 3 From the X-ray measurements for the α-$Si_3N_4$ of the sintered bodies, the lattice constant value in the C-axis was found to be 5.623.

TABLE 5

| | Addition Composition and Composition ratio (% by mole and molar ratio) | | | | | |
| --- | --- | --- | --- | --- | --- | --- |
| | first aid | | | second aid | | |
| No. | $Y_2O_3$ | MgO | $Si_3N_4$: first aid | $Al_2O_3$ | AlN | $Si_3N_4$: second aid |
| 1 | 2.2 | 7.4 | 87:13 | 1.9 | 4.9 | 90:10 |
| 2 | 1.3 | 2.5 | 95:5 | 1.9 | 2.4 | 94:6 |
| 3 | 1.3 | 2.5 | 94:6 | 1.9 | 4.9 | 91:9 |
| 4 | 2.2 | 2.5 | 93:7 | 2.9 | — | 97:3 |
| 5 | 2.2 | 7.4 | 87:13 | 2.9 | — | 96:4 |
| 6 | 2.2 | 7.4 | 87:13 | 1.9 | 2.4 | 94:6 |
| 7 | 2.2 | 7.4 | 87:13 | 1.9 | — | 97:3 |
| 8 | 2.2 | 2.5 | 93:7 | 1.9 | 2.4 | 94:6 |
| 9 | 1.3 | 1.2 | 96:4 | 1.9 | — | 97:3 |
| 10 | 2.2 | 2.5 | 93:7 | 1.9 | — | 97:3 |
| 11 | 1.3 | 1.2 | 96:4 | 1.9 | 2.4 | 94:6 |

TABLE 6

| No. | Relative density of primary sintered body (%) | Relative density of secondary sintered body (%) | Crystal phase ratio α:β' (%) | Three-point bending strength (kg/mm²) | z value (β'-sialon) | Mean grain diameter (μm) α-Si₃N₄ | β'-sialon major axis | β'-sialon minor axis |
| --- | --- | --- | --- | --- | --- | --- | --- | --- |
| 1 | 96.5 | 99.3 | 2:98 | 140.2 | 0.40 | 0.5 | 2.5 | 0.5 |
| 2 | 97.2 | 99.5 | 10:90 | 145.5 | 0.50 | 0.5 | 2.3 | 0.4 |
| 3 | 96.8 | 99.2 | 20:80 | 135.2 | 0.65 | 0.5 | 2.4 | 0.5 |
| 4 | 97.4 | 99.8 | 15:85 | 150.4 | 0.30 | 0.5 | 2.5 | 0.3 |
| 5 | 97.5 | 99.4 | 5:95 | 145.2 | 0.45 | 0.4 | 2.3 | 0.3 |
| 6 | 96.8 | 99.8 | 25:75 | 153.7 | 0.25 | 0.4 | 2.0 | 0.3 |
| 7 | 96.3 | 99.2 | 12:88 | 148.7 | 0.30 | 0.4 | 2.2 | 0.4 |
| 8 | 97.2 | 99.5 | 8:92 | 168.8 | 0.50 | 0.3 | 1.5 | 0.2 |
| 9 | 98.0 | 99.2 | 15:85 | 136.5 | 0.20 | 0.3 | 2.0 | 0.5 |
| 10 | 97.8 | 99.7 | 2:98 | 145.4 | 0.25 | 0.3 | 1.5 | 0.2 |
| 11 | 97.3 | 99.4 | 30:70 | 137.5 | 0.65 | 0.2 | 1.5 | 0.2 |

As is apparent from the above-described detailed description, according to the present invention, a silicon nitride sintered body having a superior mechanical properties, especially at ordinary temperatures, can be produced with a high productivity in a high yield at a low cost.

What is claimed is:

1. A silicon nitride sintered body consisting of a composition falling within a range surrounded by the lines joining the points A, B, C and D in the ternary composition diagram of $Si_3N_4$-first aid-second aid shown in FIG. 1, the first aid consisting of a combination of two oxides of $Y_2O_3$ and MgO, the second aid consisting of one or both of $Al_2O_3$ and AlN wherein the addition composition ratio of $Si_3N_4$ to the first aid is in the range of from 85:15 to 99:1 percent by mole and the addition composition ratio of $Si_3N_4$ to the second aid is in the range of from 90:10 to 99:1 percent by mole, said sintered body comprising crystal phases containing both an α-$Si_3N_4$ crystal phase and a β'-sailon crystal phase, the relative density of the sintered body being 98% or more, the precipitation ratio of the α-$Si_3N_4$ crystal phase to the $\beta'$-sialon crystal phase in the sintered body being more than 0 but not more than 30 in terms of the peak intensity in X-ray diffraction.

2. A silicon nitride sintered body according to claim 1, wherein the mean grain diameter of the $\alpha$-Si$_3$N$_4$ crystal grains and the mean grain diameter in the major axis of the $\beta'$-sialon crystal grains in the sintered body are 0.5 $\mu$m or less and 5 $\mu$m or less, respectively.

3. A silicon nitride sintered body according to claim 2, wherein the mean diameters in the direction of three major axis and in the direction of the minor axis of the $\beta'$-sialon crystal grains are 2.5 $\mu$m or less and 0.5 $\mu$m or less, respectively.

4. A silicon nitride sintered body according to claim 1, wherein the $\alpha$-Si$_3$N$_4$ in the sintered body has a lattice constant value of 5.623 in the C-axis measured by X-ray diffraction.

5. A silicon nitride sintered body according to claim 1, wherein the $\beta'$-sialon in the sintered body is represented by the general formula $Si_{6-z}Al_zO_zN_{8-z}$ wherein $0 < z < 1.0$.

* * * * *